United States Patent [19]

Beardsley et al.

[11] 4,380,067
[45] Apr. 12, 1983

[54] ERROR CONTROL IN A HIERARCHICAL SYSTEM

[75] Inventors: Brent C. Beardsley, Tucson; Allen C. Brailey, Pima, both of Ariz.

[73] Assignee: International Business Machines Corporation, Armonk, N.Y.

[21] Appl. No.: 254,356

[22] Filed: Apr. 15, 1981

[51] Int. Cl.³ .............................................. G06F 11/20
[52] U.S. Cl. ..................................... 371/11; 364/200; 371/5; 371/8
[58] Field of Search ................. 371/5, 8, 9, 10, 11; 364/200, 900; 455/8, 9

[56] References Cited

U.S. PATENT DOCUMENTS

| | | | |
|---|---|---|---|
| 3,704,363 | 11/1972 | Salmassey | 364/200 |
| 3,818,199 | 6/1974 | Grossman | 371/11 |
| 3,906,200 | 9/1975 | Petschauer | 371/10 |
| 3,917,933 | 11/1975 | Scheuneman | 371/10 |
| 3,999,051 | 12/1976 | Petschauer | 371/10 |
| 4,010,450 | 3/1977 | Porter et al. | 364/200 |
| 4,048,481 | 9/1977 | Bailey, Jr. | 371/16 |
| 4,053,752 | 10/1977 | DeJohn et al. | 371/11 |
| 4,174,537 | 11/1979 | Chu | 364/200 |
| 4,241,445 | 12/1980 | Payen | 371/5 |
| 4,328,581 | 5/1982 | Harmon et al. | 371/8 |

Primary Examiner—Charles E. Atkinson
Attorney, Agent, or Firm—Herbert F. Somermeyer

[57] ABSTRACT

A hierarchical communication system has multipaths for different levels of the heirarchy, each set of paths is assigned a criticalness to the successful operation of the system. Error rates for all of the paths are monitored. A threshold for defining an unusable data path is based upon the criticalness of the path to successful operation. That is, the more critical the path, the higher the error rate that will be sustained. A specific embodiment employs shift registers for indicating the error rate of the last predetermined number of usages of the given paths. A mass storage system employing the error-rate system is described.

10 Claims, 4 Drawing Figures

ERROR CONTROL IN A HIERARCHICAL SYSTEM

FIELD OF THE INVENTION

The present invention relates to hierarchical communication systems, such as those employed with mass storage systems, and more particularly, to error control systems which ascertain unacceptable error rates for selectively removing error prone portions of the network from usage.

DISCUSSION OF THE PRIOR ART

Hierarchical communication networks, such as those employed with multilevel stores, have been used for years. One of their features is alternate pathing, i.e., when one path is unusable for one reason or another, an alternate path exists such that data transfers can be processed throughout the various levels of the hierarchy. Various means for testing paths and units within a multi-unit data processing system or communication system are well known. Isolation of such units, when defective, is a common practice. For example, U.S. Pat. No. 3,818,199 discloses an apparatus wherein defective system units are placed in a test or diagnostic state and isolated from the rest of the system. Individual system units indicate the respective functional states to a central station which comprises a digital storage register. Further, U.S. Pat. No. 4,048,481 discloses an apparatus which compares the states of record error indicators with a predicted bit pattern for detecting whether recovery apparatus is operating properly.

Many such data processing systems employ logging or error count retention means for aiding in the diagnostic and error recovery procedures. For example, U.S. Pat. Nos. 3,906,200; 3,917,933; and 3,999,051 all disclose maintenance procedures which utilize a defective device counter to schedule preventive maintenance of a main storage unit. That is, preventive maintenance is based upon error rates. Further, U.S. Pat. No. 4,174,537 discloses a system with error logging means to provide for automatic logging of detected errors during memory accesses, all based upon a priority. Memory modules time share address and output circuits, as well as error checking, and detection and correcting circuits. U.S. Pat. No. 3,704,363 shows a system which maintains a statistical data record of usage and error information for each device and for physical storage volumes within each device. Such usage-error information is supplied to a storage area each time one of the usage or error counts reaches a predetermined threshold. Alternate addressing paths for addressing data in one or another main memory module is provided, as shown in U.S. Pat. No. 4,010,450, upon detection of a failure in a portion of main memory or in a main memory module.

In systems employing magnetic tape recorders, errors due to media imperfections and aberrations in the media to transducer interface are difficult to distinguish from errors due to recorder malfunctions. Some means should be provided so that media-related errors do not result in false indications of the errors. In a hierarchical system employing such recorders, propogation of error indications have to be controlled.

From all of the above, it is seen that error recovery procedures and error isolation is an important aspect of data processing. All of the above involve various degrees of complicated and special circuits which add costs to a data processing system, particularly where a large number of units are involved, and where interactions between a large number of units is important. For example, in the hierarchical storage system having a plurality of layers of control, data transfers and storage over any one of a plurality of alternate paths using alternate units, while complex in itself, requires greater complexity for achieving effective error recovery and control. Accordingly, it is desired to provide a system and method which simplifies control of such a complex system and yet provide adequate error control and unit and path usability features.

SUMMARY OF THE INVENTION

It is an object of the invention to provide a relatively simple and straightforward method and apparatus which enables high usability while selectively eliminating error prone units and paths in accordance with predetermined criteria.

For example, in a multilevel communication system having a plurality of units at each level with a plurality of paths extending between the levels, a plurality of alternate paths extend between extremities of the communication system. For example, a first set of paths between a first and a second level can have a first criticality. A second set of paths between a second and third level of the communication network has less criticality, while a set of devices in the third level, which are accessible by combinations of first and second sets of paths, have a third criticality. For each of the paths and units, a recent tally of errors and attempted accesses is maintained. When the ratio of errors to accesses exceeds a predetermined threshold, for each of the paths or units, wherein each threshold is determined in accordance with the criticalness of the respective path or unit, then that given path or unit is identified as being unusable. That is, the path or unit is too error prone for providing high usability. In general, the more critical a path is to the successful operation of the total network, the higher the error rates that will be tolerated.

In another aspect of the invention, propogation of errors in a hierarchical system is controlled by detecting and logging error conditions at the access end of the hierarchy and proceeding toward a magnetic tape recorder or device end of the hierarchy. In this manner, error condition indications tend not to propogate from a device toward the access end of the hierarchy.

In a specific version of the invention, a non-reentrant shift register is kept for each path and unit. Each time an access to a path or unit is attempted, the contents of the corresponding shift register are shifted once with a zero carry input to a least significant bit position. If an error is detected, the least significant bit position is set to unity. Accordingly, the number of ones in a shift register at a given time indicate the error rate in number of errors per number of bit positions in the shift register. For each attempted access, the number of ones in the shift register can be examined and if a given threshold is exceeded, an error flag is set. The error flag indicates that the corresponding path or unit is unusable. The error rate for the different paths and units is varied in accordance with the criticalness of such path or unit.

In a preferred form of the invention, the shift registers are microcode controlled, the detectors are microcode implemented, and the error flags are digital registers which are sensed by microcode which enables access to the various paths and units of the multilevel communication network. In a specific form of the invention, the communication network is integral with the mass storage system having a hierarchy of data transfers and accesses.

The foregoing and other objects, features and advantages of the invention will be apparent from the following more particular description of preferred embodiments of the invention, as illustrated in the accompanying drawings.

DETAILED DESCRIPTION

Figure 1:
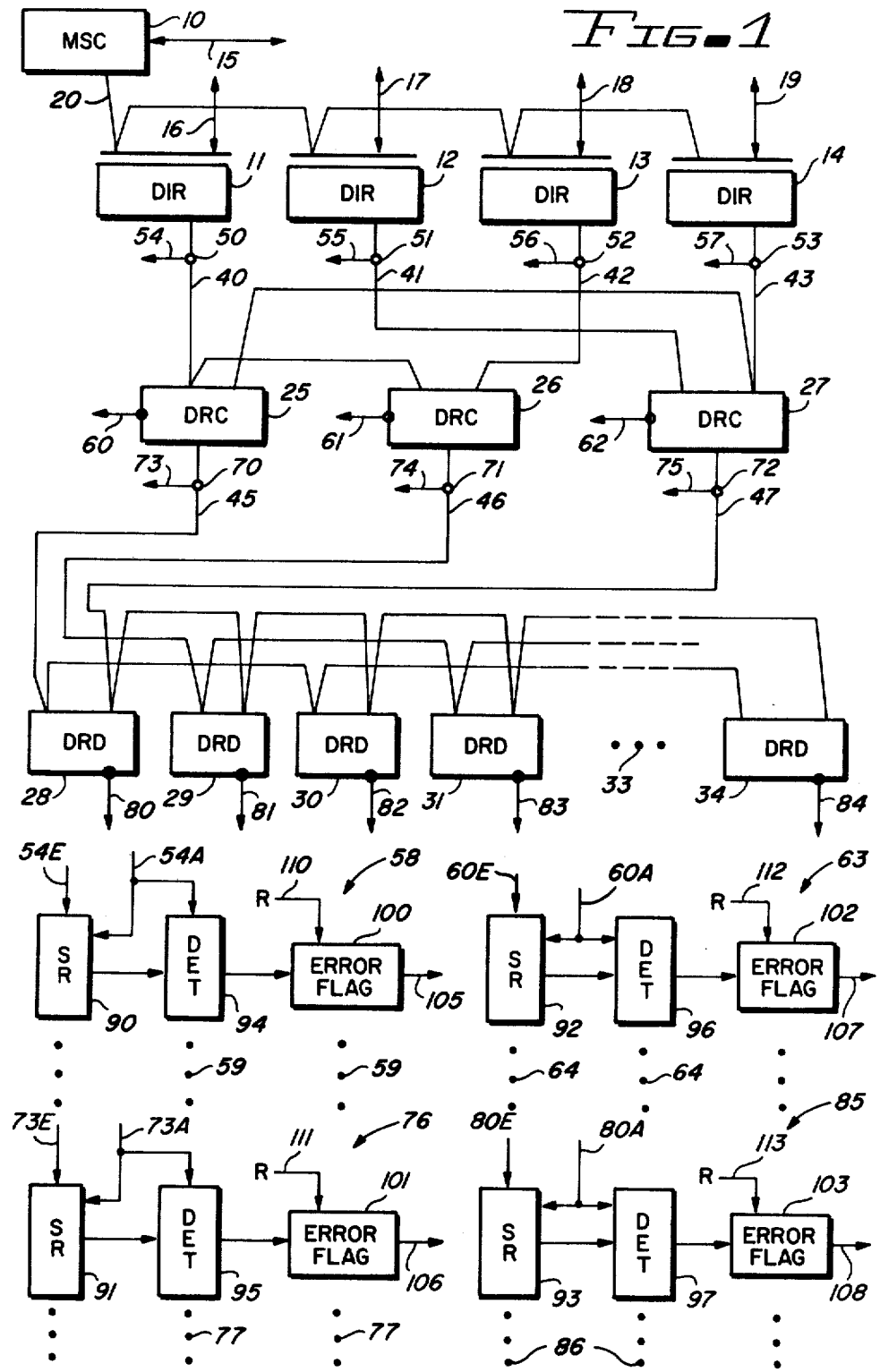
FIG. 1 is a diagramatic showing of a multipath, multilevel hierarchal communication network for a mass storage system which employs the teaching of the present invention.

Referring now more particularly to the drawings, like numerals indicate like parts in the Figures. FIG. 1 illustrates a mass storage system which includes a multipath, multilevel communication network which facilitates data transfer and control communications between various units constituting the mass storage system. Such a mass storage system may be constructed in accordance with the IBM 3850 MSS, a mass storage system manufactured by International Business Machines Corporation, Armonk, N.Y. The manufacturer of the IBM 3850 system describes the system in a series of manuals which includes publication no. GA32-0029, entitled, "IBM 3850 Mass Storage System (MSS) Principles of Operation", publication GC35-001-X, entitled "OS/VS Mass Storage System (MSS) Planning Guide", and GC38-1000, entitled "OS/VS Message Library: Mass Storage System (MSS) Messages". Also see publication no. GA22-0035, entitled "IBM 3850 Mass Storage System (MSS) Principles of Operation: Theory".

A mass storage control MSC 10 provides operational control of the entire mass storage system. A plurality of storage directors DIR 11-14 provides communications from a data processing system consisting of a plurality of hosts (not shown), respectively, via a plurality of input/output connections 16, 17, 18 and 19. These connections are the usual peripheral device to host connections as used on computers manufactured by International Business Machines Corporation. Control of the DIR's 11-14 by MSC 10 is via a connection 20 which extends to all DIR's. MSC 10 receives instructions from the host (not shown) via input/output connection 15 and relays the messages and gathers sense data and error data from DIR's 11-14 via connection 20. DIR's 11-14 are connected to a plurality of disk data storage apparatus (DASD not shown) which constitute a buffer store for later-described data recording devices 28-34 (tape recorders). Apparatus and methods of the present invention are included within MSC 10 in its cooperation and control of the to-be-described elements of the mass storage system.

The directors are connected to a plurality of data recording controls DRC's 25-27, which in turn are connected through a plurality of paths to a larger plurality of data recording devices DRD's 28-34. Ellipsis 33 indicates that a plurality of the DRD's are not shown for purposes of simplicity. In a preferred form of constructing the mass storage system, the DRD's 28-34 are mounted into a tape library (not shown) for automatically receiving and supplying data cartridges from a storage wall, as is practiced on the IBM 3850 system, supra. The various interconnections between DIR's 11-14 and DRC's 25-27 include a first set of paths 40 extending from DIR 11 to DRC 25 and DRC 26. Paths 40 are a first set of paths having a first criticalness for accessing the data cartridges (not shown) which are automatically transferred to and from the DRD's 28-34. In a similar manner, DIR 12 is connected to DRC 27 via paths 41. Paths 41 have the same critical factor as paths 40. DIR 13 is connected to DRC 26 via paths 42 while DIR 14 is connected to DRC's 25 and 27 via paths 43. Paths 40-43 are those connections used in connecting peripheral equipment directors or control units to controllers, such as DRC's, for controlling the DRD's. In any event, the number of paths from the DIR's 11-14 to the DRC's 25-27 is considered primary because of the limited connections 16-19. That is, access to data by a host (not shown) is through one or more directors to the DASD. However, if a path from a DRD to DASD via a director is not usable, then host intervention is required to provide recovery. It is desired to provide a maximum alternate pathing and usability. Hence, in order to avoid host intervention, these upper level paths are considered critical and therefore, will sustain a higher error rate before being determined nonusable. It is understood that connections 40-43 can be of the radial type or of the daisy-chain type. The term path means each individual connection, whether logical or real; paths 40 have two paths, one between DIR 11 and DRC 25 and a second between DIR 11 and DRC 26. Similarly, paths 43 include two paths; one between DIR 14 and DRC 27, and one between DIR 14 and DRC 25. It is these individual paths that are error controlled in this implementation of the invention.

Attempted access by DIR's 11-14 over the paths 40-43 is scheduled by MSC 10. Each scheduled access is termed an attempted access. When the DIR's 11-14 return no error condition within a predetermined timeout, then a successful access is defined. If an error condition is returned, i.e., no access has been provided over the paths 40-43, an error condition is logged, as later described. Such error detection circuits and access memory units for the paths 40-43 are respectively indicated by circles 50-53, respectively, for paths 40-43. The connections to the MSC 10 circuitry, later described, is via error conducting paths 54-57, respectively, for circuits 50-53.

Not only can the paths 40-43 be error prone, but also the internal operation of the DRC's 25-27. That is, access to the DRC's 25-27 is achieved yet the DRC cannot respond to the request because of internal problems; usually such reporting is by diagnostic circuits (not shown) constructed using known data processing techniques. Such error reporting is indicated by the error paths 60-62, respectively, for DRC's 25-27. An example of an error condition within a DRC which would cause such an error reporting would be the failure of a signal detection circuit to faithfully detect signals.

The multipaths between the DRC's 25-27 and DRD's 28-34 are a less critical set of paths in that the multipathing between a director 11 and the DRC's 25-27 allows the peripheral system to perform multipathing without host intervention. For example, DRC 25 which is accessible by several of the DIR's 11-14 has a set of paths 45 extending to DRD's 28, 30 and 34. In a similar manner, DRC 26 which is also accessible by a plurality of DIR's 11-14 through the paths 40-43 has a set of paths 46 extending to DRD's 29, 31 and so forth. In a similar manner, DRC 27 has a set of paths 47 for selectively connecting any of the DIR's 11-14 to the DRD's 28-34. Again, the paths 45-47 have access and error indicating circuits 70-72, respectively, which communicate error and access information over error reporting paths 73-75, respectively. In a microcode programmed embodiment, MSC 10 defines access by microcode action which requests access to a given DRD through a given DRC and a DIR. For example, a request by MSC 10 to DIR 11 to use a path 40 through DRC 26 and thence, a path 46 to DRD 29 can be counted as an access attempt for paths 40 and 46.

The DRD's 28-34 can also have error conditions in the same manner that DRC's 25-27 can have error conditions. Accordingly, the internal error conditions, such as a failure to load a data cartridge, failure to sense signals on a magnetic record medium, and the like, can be reported over the error reporting paths 80-84, respectively, for the DRD's 28-34. Such error reporting physically can proceed from the DRD's 28-34 through the DRC's 25-26 and a director DIR 11-14 to MSC 10. Separate reporting, as shown in FIG. 1, is also employable.

All of the reporting paths shown in FIG. 1 are coupled to error rate indicators and detectors within MSC 10. All of these circuits are shown at the bottom portion of FIG. 1. For example, circuit 58 is representative of all of the circuits for detecting the error rates of paths 40-43. Ellipsis 59 indicates three circuits 58 for paths 41, 42 and 43. Circuit 58 includes a non-reentrant shift register 90 which receives an error indicating signal over line 54E which is a portion of path 54. Attempted access is indicated either by a signal on line 54A from the MSC 10 scheduler or a SELECT OUT signal from DIR 11. The signal on line 54A not only shifts the contents of shift register 90, but also actuates detector 94. It is understood that the circuits which supply the signal on line 54A are those which occur after a predetermined time-out after the request for access is sent to DIR 11, i.e., the signal on line 54E can arrive before the signal on line 54A. Typically, shift register SR 90 has eight bit positions for indicating the error rate over the last eight attempted accesses for path 40. Detector 94 typically will be a four-error detector such that an error rate of 50% is required before a signal is supplied by detector 94 to set error flag 100. Error flag 100 being set indicates that a respective path 40 is unusable. That is, path 40 remains usable until an error rate of 50% is detected; such error rate being in accordance with a maximum criticalness of the paths 40 to the successful operation of the illustrated hierarchical network. The non-usable usability indication of error flag 100 is supplied over line 105 to access circuits of MSC 10 which are not shown because accessing units in a peripheral system are so well known.

In a similar manner, circuit 63 and ellipsis 64 represent the error rate circuits associated with DRC'S 25-27. A shift register 92 corresponds with shift register 90, detector 96 corresponds to detector 94, and error flag 102 corresponds to error flag 100. The DRC nonusability signal is supplied over line 107, respectively, for each of the DRC's 25-27. Circuit 63 is for DRC 25, while ellipsis 64 indicates the similar circuits for DRC's 26, 27. Line 60E receives the error signal from DRC 25, while line 60A receives the access attempt signal; both of these lines are portions of error reporting path 60.

In similar manners, circuits 76 and 85, respectively, are associated with the error signals on a path 45 and DRD 28. Both of these circuits are constructed identical to circuits 58 and 63. The shift registers 91 and 93 correspond to shift register 90, while line 73E contains the errors signals from a path 73 and line 73A contains the access attempt signal from a path 73. In a similar manner, lines 80E and 80A correspond to a path 80, respectively, for shift register 93 and detector 97. Ellipses 77 and 86 represent the circuits for the other DRC's and DRD's not shown. Error flags are respectively reset upon predetermined conditions such as initial program load and successful error recovery as represented by the reset lines 110-113, respectively, for circuits 58, 63, 76 and 85. The error rate for DRC's 25-27 can be five out of eight for a greater criticalness since the number of DRC's are less than the number of paths available between the DIR's 11-14. In the event a greater number of DRC's are provided in the system, the criticalness factor may be reduced and then the error rate is also correspondingly reduced. That is, the criticalness of the paths and units is configuration dependent. In a similar manner, the criticalness of paths 45-47 requires three out of eight errors before a path is made non-usable. Since the number of DRD's 28-34 is the largest, the criticalness of this unit is the least. Accordingly, instead of eight bits in shift register 93, sixteen bits are provided, and only four errors in the sixteen access attempts will require that a given DRD be made non-usable. Again, if the number of DRD's were reduced, the criticalness factor may be correspondingly increased.

Figure 2:
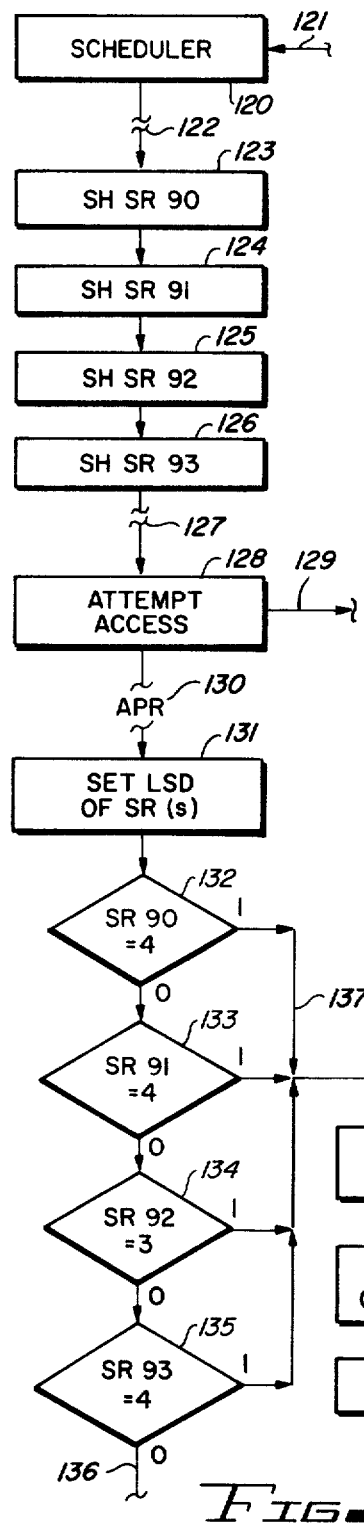
FIG. 2 is the logic diagram implementing the invention in a microcode controlled controller for the FIG. 1 illustrated network.

In a preferred mode of operation, MSC 10 is a programmed digital computer which performs all of the functions shown in items 58, 63, 76 and 85 in microcode form. FIG. 2 illustrates the logic of such operations. MSC 10 receives requests and instructions from connected hosts via connection 15. Such received commands are interpreted and result in actions to be taken by the FIG. 1 illustrated apparatus. When a DRD 28-34 is to be accessed for either recording on a magnetic tape (not shown) or reading from such a magnetic tape, a known pathing algorithm is executed. Such pathing algorithm will select a director 11-14, a DRC 25-26, a DRD 28-34 and one of the several paths extending therebetween.

Such information is supplied to a scheduler 120, as indicated by arrow 121. Scheduler 120 constructs the sub-commands to be supplied to a director 11-14, as well as perform other functions within MSC 10. In other words, scheduler 120 actually sets up and schedules the operations that were defined by other portions of MSC 10. From scheduler 120, MSC 10 performs some non-pertinent functions at 122. Then, in steps 123-126 signal contents in the binary shift registers 90-93 are shifted one digit position from a least significant digit position toward a most significant digit position. The shift registers are selected in accordance with the paths and the units designated via scheduler 120. For example, when the path to be accessed includes directory 11, paths 40, DRC 26, path 46 and DRD 29, then the shift registers associated with those units and paths are shifted right one digit position. The addressing of such shift registers is so well known, it is not described. Such shifting represents an attempted access to those respective paths and units as commanded by scheduler 120. Following the shift in steps 123-126, other non-pertinent functions 127 are performed by MSC 10. Then at 128, MSC 10 commands DIR 11 to attempt the access. DIR 11 does in fact attempt the access to establish a data communication. Such access can be reading a cartridge table of contents from a tape data cartridge (not shown) in DRD 29. It can also require movement of tape by DRD 29 to an addressed location. It can also request transfer of data signals between a host and a DRD 29, or from a DASD (not shown) of the mass storage system to DRD 29. The scheduler can also schedule a plurality of such operations. Usually the attempted access to a DRD will be successful. Then MSC 10 follows path 129 which is an error-free path requiring no further action with respect to the shift requisters 90-93.

In the event the attempted access resulted in an error which either could have prevented access or reduced the reliability of such access, then alternate path retry (APR) can be employed at 130. Alternate pathing is well known as used in the IBM 3850 MSS and is not described for that reason. Whenever an alternate path is to be found, the prior attempted access has been unsuccessful. Accordingly, at 131 MSC 10 sets the least significant digit (LSD) (digit entrance) of the shift register which represents the point of error. For example, the point of error can be at path 46. Then shift register 92 has its LSD set to 1. On the other hand, if path 40 was the cause of the aborted access, then shift register 90 will have its LSD set to 1. In a similar manner, DRC 26 error condition could cause the LSD of shift register 91 to be set, while a failure in DRD 29 would cause the LSD of shift register 93 to be set. All of the above logs the occurrence of an error in the shift register for maintaining a memorization thereof within MSC 10. One error prevents access to lower levels of the hierarchy.

After the error has been memorized, MSC 10 examines the shift registers to see if the error rate, as represented by the bit pattern in the shift register, has exceeded a threshold in accordance with the criticalness of the path or unit. In steps 132 through 135, the four shift registers 90-93 are examined for their numerical contents. When the error location is known, only the respective shift register need be examined. If the numerical contents is less than the provided threshold in the shift registers, then no further error action need be taken. MSC 10 follows path 136 to perform other functions not pertinent to an understanding of the present invention. On the other hand, if any one of the shift registers indicates an excessive error rate, the error exit from the steps 132-135 via path 137 is followed. At 139, MSC 10 examines a subsystem configuration map (not shown) to see whether or not the path that is remaining as an access path to a unit is the least path, i.e., further errors would prevent access to a DRD 29, for example. If this is the case, a so-called last path flag (not shown) is set to prevent the last path from being error detected. At 139, the configuration of the mass storage system is modified in that the error prone unit or path is removed from a configuration map (not shown) stored in MSC 10. Such a configuration map is well known and designates the paths and units constituting the mass storage system. Referring to FIG. 1, the error flags 100-103 correspond to MSC 10 following path 137. Then at 140, all of the modifications made to the configuration map at 139, as well as the analysis set forth at 138, and other ancillary error data not described in the present specification, are forwarded to a host at 140. Then MSC 10 proceeds to other actions beyond the scope of the description at 141.

Figure 3:
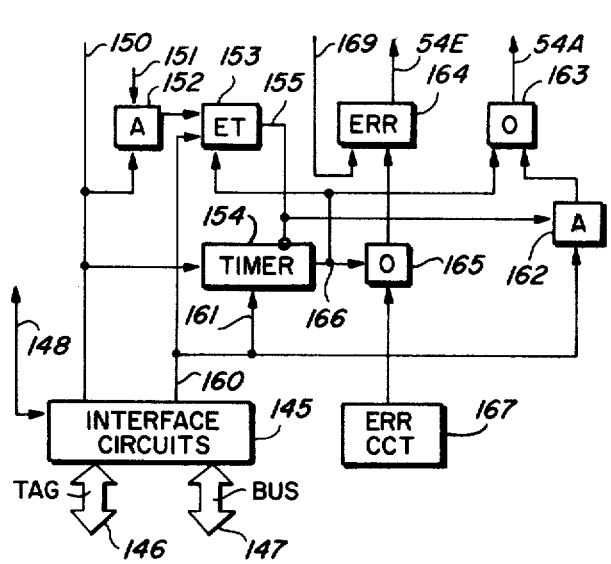
FIGS. 3 and 4 show circuits for generating error-indicating and shift signals for the FIG. 1 illustrated network.
Figure 4:
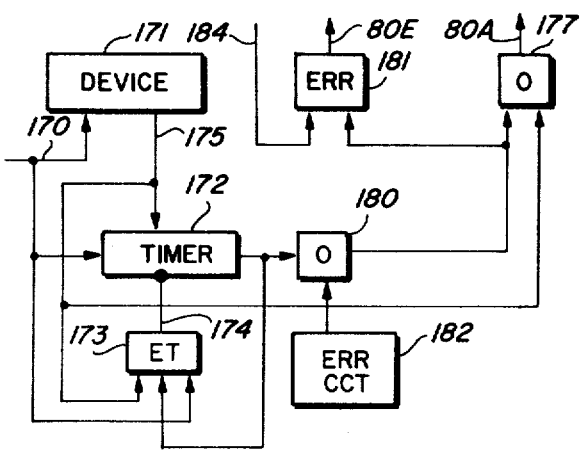

FIGS. 3 and 4 illustrate circuits usable with the FIG. 1 illustrated embodiment for generating error signals used for ascertaining error rates in paths and units. FIG. 3 shows a path error rate detection circuit which is installed in a selecting unit, i.e., such as in director 11 for checking the paths 40 as implemented by circuit 50. The same circuit can be used for implementing the circuit 70 for path 45. The illustrated circuit is connected to the usual interface circuits 145 which communicate with a unit to be selected, such as DRC 25. Such communications employ the usual tag or control lines 146 and input-output data bus lines 147. Circuits 145 exchange signals with other portions of the selecting unit not shown in FIG. 3, all as indicated by line 148. Line 150 carries a control signal indicating to interface circuits 145 that a selecting unit desires to initiate access to a unit to be selected. Auxillary control signals, such as address signals indicating the unit to be selected, supplied over line 151 enable AND circuit 152 to pass the control signal on line 150 to set enable timer (ET) flip flop 153 to the active condition. ET 153 enables timer 154 to initiate a timing-out cycle, which is simultaneously activated by the signal on line 150. Normal response by the unit being selected via the path which includes the tag lines 146 resulting in a "responded-to" signal being supplied by interface circuits 145 over line 160. The responded-to signal resets ET 153 which disables timer 154, resets timer 154 and enables AND circuit 162 to pass the ET 153 timer enable signal. From circuit 162, the signal passes through OR circuit 163 and over line 54A to shift the contents of shift register 90, as shown in FIG. 1, for the director 11 analysis of a path 40 error rate.

In the event a responded-to signal was not supplied over line 160, timer 154 supplies an output pulse over line 166 which also resets ET 153. The timer output pulse also travels through OR circuit 165 to set error flip flop 164 to the active condition for supplying an error-indicating signal over line 54E for setting the least significant digit of shift register 90. Since there is one circuit, as shown in FIG. 3, for each of the paths; for paths 40 there are two such circuits. Also, there is a similar connection to all of the error rate circuits 58, 63, 76 and 85 of FIG. 1, each error rate determination is asynchronous to all other operations of the illustrated mass storage system. Error flip flop 164 is reset by MSC 10 by a reset signal supplied over line 169. The generation of this reset signal is beyond the scope of the present description.

In addition to the timer 154 detection of an error condition, additional error circuits 167 are also employed. For example, when a path 40 is carrying signals between DIR 11 and DRC 25, a parity error may occur. Accordingly, error circuit 167 includes parity detection circuits, as well as other monitoring circuits for determining error conditions in paths 40. Detection of an error by error circuit 167 results in a signal being supplied through OR circuit 165 to error flip flop 164. Then the next time a SELECT OUT signal is supplied over line 150, the least significant digit position of the associated shift register such as shift register 90, already is set to the 1 condition such that shifting of the contents of this shift register via AND circit 162 and OR circuit 163 results in the error signal being shifted into the shift register. The output signal from timer 154 on line 166 also travels through OR circuit 163 to shift the contents of the shift register 90. As explained earlier, it is desired to have the shift pulse follow the error setting pulse. Accordingly, OR circuit 163 can include a delay element (not shown) for delaying the timer 154 line 166 time-out signal. Of course other circuits that are illustrated in FIG. 3 may also be employed for implementing this aspect of the present invention.

FIG. 4 shows a similar circuit for detecting internal error conditions in each of the DRD's 28–34. Similar circuits have been employed in the prior art and can be employed with DRC's 25–27. A control (not shown) within the DRD supplies an initiate or actuate signal over line 170 to actuate an activity in a portion of the device indicated by box 171. In a DRD, this may be an automatic threading operation, an automatic load of a data cartridge, a rewind operation, and the like. All of these operations will have predetermined permitted times of execution such that timer 172 can be used for detecting a malfunction by the apparatus represented by box 171. Accordingly, there can be one circuit, as shown in FIG. 4, for each function being monitored within DRD 28–34. The initiate signal on line 170 not only activates device 171, but also timer 172 and sets ET flip flop 173. ET 173 supplies a timer enable signal over line 174 to permit timer 172 to perform its time-out cycle. When device 171 completes its function, a completion signal is supplied over line 175 which resets timer 172 and resets ET 173. Additionally, the completion signal travels through OR circuit 177 to line 80A for shifting the signal contents of shift register 93 operatively associated with DRD 28, for example. In the event that device 171 does not supply a completion signal 175 before timer 172 times out, a time-out signal on line 178 travels through OR circuit 180; thence, sets error flip flop 181 which supplies its active signal over line 80E to set the least significant digit position of shift register 93 for indicating a detected error. The signal of OR circuit 180 also travels through OR circuit 177, after a suitable delay, to provide the shift signal on line 80A. The time-out signal on line 178 also resets ET 173. Other error detection circuits 182, which may include timers such as timer 172, also provide signals into OR circuit 180 for performing similar error indicating functions. Error flip flop 181 is reset via a signal received over line 184 from a control within DRD 28 (the control is not shown). Such signal on line 184 may be instituted by MSC 10 or independently by control circuits within DRD 28 or any of the DRC's 25–27.

While the invention has been particularly shown and described with reference to preferred embodiments thereof, it will be understood by those skilled in the art that various changes in form and details may be made therein without departing from the spirit and scope of the invention.

What is claimed is:

1. The method of operating a multilevel communication network having first and second levels each with a plurality of paths, a plurality of units selectively interconnecting said levels such that one path in each level is coupled via a unit to create a signal transfer path through said levels and a one of said units, the machine-executed steps of:
   assigning a criticalness for successful network operation to each path in both said levels, said criticalness being different in such levels;
   measuring the error rate of each path over a predetermined number of path usages;
   setting a threshold of error-rate acceptability for said paths in accordance with said assigned criticalness, the greater the criticalness, the greater the threshold;
   comparing said measured error rates with said thresholds, respectively, for said paths; and
   when said measured error rate exceeds said threshold for a given path, reconfiguring said network to eliminate said path therefrom.

2. The method set forth in claim 1 wherein said measuring step includes the machine-executed steps of:
   for each said path, selecting a digital register having a number of digital positions equal to said predetermined number for said paths, respectively;
   said path usages comprising attempted path access, whether successful or not; for each said usage shifting the contents of said register for the respective path one digit position in a non-reentrant manner from a digit entrance position toward a digit exit position;
   monitoring each path usage for each said path for predetermined errors; and
   for each monitored error, setting said digit entrance position of said respective digital register to an active condition.

3. The method set forth in claim 2 further including the steps of counting the number of active digit positions in a given digital register for indicating said error rate for a respective one of said paths.

4. The method set forth in claims 1, 2 or 3 further including a plurality of devices connectable to said second level paths;
   the further steps of:
   assigning a criticalness to device operation less than the criticalness of said levels and setting a corresponding lower device threshold for each of said devices;
   monitoring operation of each said devices for predetermined device errors and keeping a running tally of monitored errors for a second predetermined number of device usages to indicate a device error rate;
   comparing said device error rate with said device threshold and when said device error rate exceeds said device threshold, reconfiguring said network to eliminate only said devices therefrom that indicate said exceeding error rate.

5. The method set forth in claim 4 wherein said device monitoring and comparing steps includes for each of said devices;
   the steps of:
   selecting a device digital register having said second predetermined number of digit positions; and
   each said device usage comprising attempted device operation, whether successful or not; for each said device usage shifting the signal contents of said device digital register one digit position in a non-reentrant manner from a device-digit entrance position toward a device-digit exit position;
   for each said monitored predetermined device error setting said device-digit entrance position to an active condition; and said comparing step comprising counting the number of said active device-digit positions and comparing same with said device threshold.

6. The method set forth in claims 1, 2, or 3, further including the steps of:

scheduling a selected device access via a selected path in each of said levels, said scheduling being a usage for each said selected paths and device;

upon monitoring an error attempting an alternate path retry and as a part of said retry measuring the error rate for each said selected paths and device.

7. In a multilevel peripheral system having a first set of director units adapted to be attached to hosts, a second set of device controls, a first set of signal paths extending between said director units and said device controls such that multipathed connections between said director units and said device controls is enabled, a third set of peripheral devices, a second set of signal paths extending between said device controls and said peripheral devices such that multipathed connections between said device controls is enabled, control means being coupled to all of said device controls, said devices and said paths for enabling accessing said paths to establish said multipath enabled connections, the improvement including in combination:

a plurality of digital shift register means, each said digital shift register means having a first predetermined number of digit positions, one of which is a digit entrance and another is a digit exit and the digital shift register means shifting digits stored therein from said entrance toward said exit; a one of said digital shift register means being for accumulating error rates for each of said paths, error monitoring means for each of said paths in both said first and second sets and being responsive to predetermined errors in said paths to set an error-indicating digit in said digit entrance, respectively:

plural access monitoring means operatively associated with said paths, respectively, to shift the digit contents of said digital shift register means, respectively, for each path connection;

first and second error rate monitor means operatively associated with said digital shift register means for said paths in said first and second sets, respectively, and including first and second error rate thresholds, respectively, to indicate an unacceptable error rate for a given one of said paths; and reconfigure indicating means being coupled to both of said error rate monitor means for indicating said given one path is unusable.

8. The system set forth in claim 7 further including in combination:

a second plurality of device digital shift register means, each said digital shift register means having a second predetermined number, greater than said first predetermined number, of digit positions, one of which is a digit entrance and another is a digit exit and for shifting digits stored therein from said entrance toward said exit, a one of said device digital shift register means being for each of said peripheral devices;

error monitoring means for each device and being responsive to predetermined device errors to set an error-indicating digit in said digit entrance of the respective device digit shift register means;

means for indicating usage of said peripheral devices and for each usage shifting the digits in the respective said device digital shift register toward the digit exit;

device error rate means connected to said device digital shift register means for counting the number of error-indicating digits therein and including a device error rate threshold and having means responsive to said count and threshold for indicating a given device is unusable.

9. A plural unit data processing system having a plurality of paths extending between said units in a manner that alternate access paths between diverse units in the system are available, the improvement comprising:

means for indicating criticalness of each path with respect to successful system operation;

a plurality of error rate means coupled to said indicating means and respectively operatively associated with each path and having an error rate threshold in accordance with said predetermined indicated criticalness of each path and means for indicating rate or errors exceeding said thresholds, respectively;

means for monitoring errors on said paths and supplying electrical indications of such errors to the respective error rate means; and reconfiguration means being coupled to said monitoring means and to said units and paths for being responsive to said rates exceeding said threshold (RET) indications to reconfigure the system by deleting said path with the RET indication out of the system.

10. The machine-implemented method of controlling a hierarchical system having plural levels, one of the levels being an access level and another being a device level with intermediate levels therebetween; a plurality of access paths extending between said levels to provide access to said device level from said access level via said intermediate level on alternate ones of said access paths, the steps of:

for each path, establishing a permitted error rate, repetitively attempting to access said device level;

upon each attempted access to said device level, detect and log errors beginning at said access level such that error conditions closest to said access level are detected in any one access to the exclusion of error conditions at levels closer to said device level; and reconfiguring said system based upon said detected and logged error rates such that errors occurring at the device level are detected only when in a succession of said repetitive attempted accesses.

* * * * *